(12) United States Patent
Hupp et al.

(10) Patent No.: US 8,515,446 B2
(45) Date of Patent: Aug. 20, 2013

(54) DEVICE FOR DETERMINING A DEVICE POSITION

(75) Inventors: Juergen Hupp, Nuremberg (DE);
Volker Gehrmann, Erlangen (DE);
Felix Boehm, Erlangen (DE); Christian Fluegel, Nuremberg (DE); Dominik Elberskirch, Nuremberg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 706 days.

(21) Appl. No.: 12/664,203

(22) PCT Filed: May 16, 2008

(86) PCT No.: PCT/EP2008/003971
§ 371 (c)(1),
(2), (4) Date: Mar. 19, 2010

(87) PCT Pub. No.: WO2008/151706
PCT Pub. Date: Dec. 18, 2008

(65) Prior Publication Data
US 2010/0184457 A1      Jul. 22, 2010

(30) Foreign Application Priority Data
Jun. 13, 2007   (DE) .......................... 10 2007 027 141

(51) Int. Cl.
*H04W 24/00*         (2009.01)

(52) U.S. Cl.
USPC .................................... 455/456.1; 455/456.6

(58) Field of Classification Search
USPC ........... 455/11.1, 67.11, 70, 91, 115.4, 422.1, 455/446, 456.1–456.3, 500, 507, 456.1–456.5, 455/25, 575.7, 517; 342/22, 36, 42, 359, 342/378, 442, 451, 457, 463–464
See application file for complete search history.

(56) References Cited

U.S. PATENT DOCUMENTS 6,198,919 B1 * 3/2001 Buytaert et al. ........... 455/426.1
7,412,248 B2 * 8/2008 McNew et al. ............ 455/456.1
(Continued)

FOREIGN PATENT DOCUMENTS

| DE | 10 2004 027 292 A1 | 12/2005 |
|---|---|---|
| EP | 1 102 085 A2 | 5/2001 |
| WO | 92/13284 A1 | 8/1992 |
| WO | 99/21389 A1 | 4/1999 |
| WO | 99/33302 A2 | 7/1999 |
| WO | 02/33435 A2 | 4/2002 |

OTHER PUBLICATIONS

Official Communication issued in International Patent Application No. PCT/EP2008/003971, mailed on Sep. 10, 2008.

(Continued)

*Primary Examiner* — George Eng
*Assistant Examiner* — Inder Mehra
(74) *Attorney, Agent, or Firm* — Keating & Bennett, LLP (57) ABSTRACT

A device for determining a device position, which includes a receiver for receiving signals of a plurality of transmitters and a determiner for determining reception powers of the signals of the plurality of transmitters. The device further includes a provider for providing transmitter positions of the transmitters on the basis of the signals of the plurality of transmitters. The device further includes a determiner for determining a first position of the device on the basis of the transmitter positions, wherein the determiner for determining the first position is further formed to determine transmitter directions on the basis of the first position and the transmitter positions, and to determine a second position of the device on the basis of the transmitter directions, the transmitter positions and the reception powers.

24 Claims, 6 Drawing Sheets

(56) References Cited

U.S. PATENT DOCUMENTS

| | | | |
|---|---|---|---|
| 7,589,672 B2* | 9/2009 | Malinovskiy et al. | 342/463 |
| 2002/0049064 A1 | 4/2002 | Banno | |
| 2003/0197645 A1 | 10/2003 | Ninomiya et al. | |
| 2004/0248517 A1* | 12/2004 | Reichgott et al. | 455/63.4 |
| 2005/0113117 A1* | 5/2005 | Bolin et al. | 455/456.6 |
| 2006/0239202 A1 | 10/2006 | Kyperountas et al. | |
| 2007/0030841 A1* | 2/2007 | Lee et al. | 370/352 |
| 2007/0035443 A1* | 2/2007 | Johnson | 342/386 |
| 2007/0037518 A1* | 2/2007 | Ninomiya et al. | 455/41.2 |
| 2007/0103303 A1* | 5/2007 | Shoarinejad | 340/572.1 |
| 2007/0254717 A1* | 11/2007 | Yahagi | 455/562.1 |
| 2008/0261622 A1* | 10/2008 | Lee et al. | 455/456.2 |

OTHER PUBLICATIONS

Savvides et al., "Dynamic Fine-Grained Localization in Ad-Hoc Networks of Sensors," Proceedings of the 7th Annual International Conference on Mobile Computing and Networking, Jul. 16, 2001, pp. 166-179.

Blumenthal et al., "Precise Positioning with a Low Complexity Algorithm in Ad hoc Wireless Sensor Networks," Practice of Data Processing and Communications, Apr.-Jul. 2005, vol. 28, Issue 2, pp. 80-85.

English translation of Official Communication issued in corresponding International Application PCT/EP2008/003971, mailed on Feb. 11, 2010.

* cited by examiner

DEVICE FOR DETERMINING A DEVICE POSITION

BACKGROUND OF THE INVENTION

The present invention relates to the field of position determination, as it may occur in receivers in communication, multi-hop or ad-hoc networks and/or sensor networks, for example.

In wireless communication networks, position determination of individual network nodes often is possible in an inaccurate manner only. In decentralized networks, in particular, often co-operative localization is performed, wherein this may especially occur in so-called wireless sensor networks. Certain network nodes, also referred to as anchors or anchor nodes here, the position of which is known, here serve as supporting positions to determine a position of a receiver. For example, such anchor nodes may send out or communicate their positions, so that they may then be received by other mobile radio nodes. The received position information of the surrounding anchors may then be evaluated, wherein the position of a receiver can be calculated by maybe including other reception parameters, for example the reception field strength. What is problematic here, often only is the limited accuracy caused by effects in the radio field, for example.

One conventional method, for example, is the centroid method, also referred to as centroid determination in English. Here a network node receives, from surrounding transmitters, their transmitter positions and determines a geometrical centroid. Since there is no distance estimation in this method, the accuracy that can be achieved therewith is very limited only.

Another conventional method is the so-called weighted centroid method, also referred to as weighted centroid localization (WCL) in English. Here, a network node again receives position information from surrounding network or anchor nodes and determines a weighted centroid on the basis of the position information, i.e. the respective positions of the anchor nodes are weighted with the reception field strength at the network nodes, for example. This method has high inaccuracies particularly with irregular arrangements, because a group of nodes lying closely together obtains too high a weight.

Figure 6A:
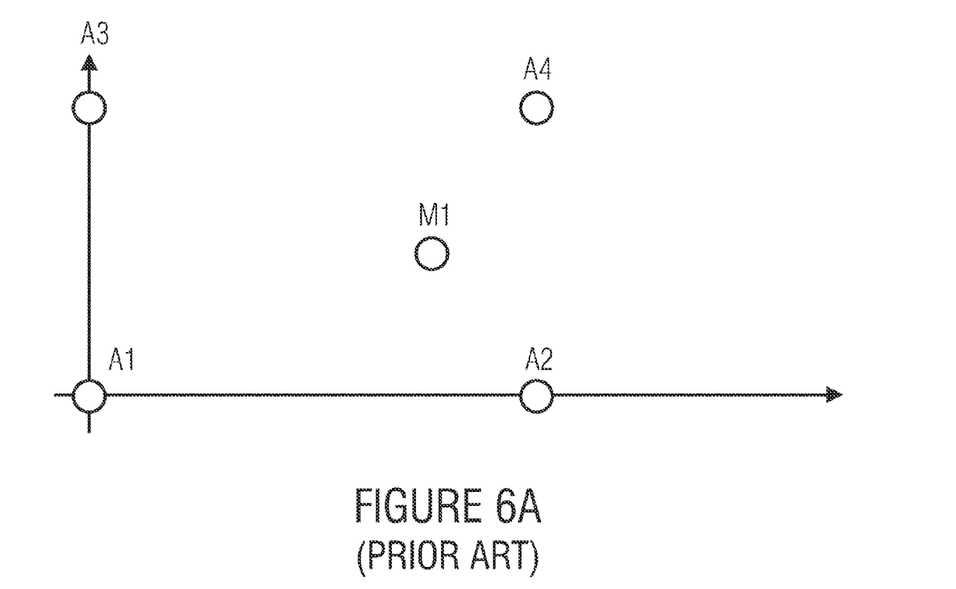
FIG. 6a shows an example of a scenario for determining the position of a network node.
Figure 6B:
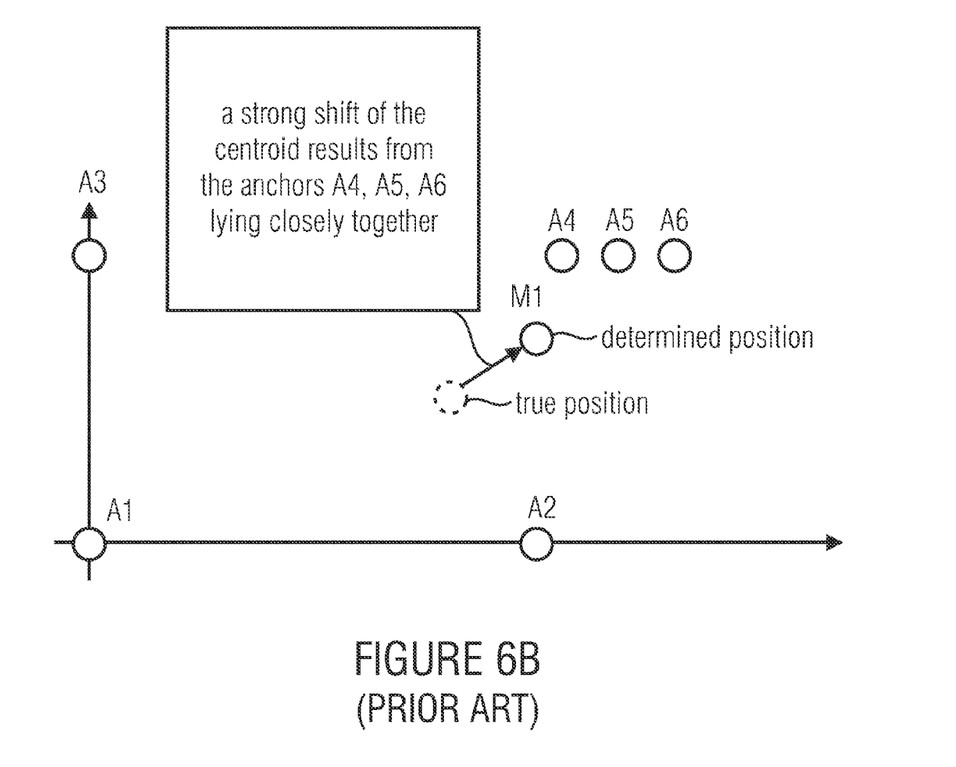
FIG. 6b is a depiction for illustrating the corruption of the position determination by accumulation of anchor nodes.

This effect can be explained in greater detail on the basis of FIGS. 6a and 6b. FIG. 6a shows a network node M1, the position of which is to be determined. The anchor nodes A1-A4 are arranged around the network node M1. In the example of FIG. 6a, it is assumed that the anchor nodes A1-A4 transmit position information to the network node M1. Based on the reception field strength of the individual nodes A1-A4, as well as their positions, the network node M1 can determine its position on the basis of the weighted centroid method. The position determination of the node M1 in FIG. 6a works relatively accurately here, because the anchor nodes A1-A4 are arranged largely regularly around the network node M1.

FIG. 6b shows another example of a weighted centroid method. FIG. 6b again shows a network node M1, the position of which is to be determined. The true position of the network node M1 is indicated in FIG. 6b by way of a dashed circle. In FIG. 6b, the network node M1 is surrounded by six anchor nodes A1-A6. It can be seen in FIG. 6b that there is an accumulation of anchor nodes around the anchor node A4, since the anchor nodes A4 to A6 lie relatively closely together. According to the above explanation, the network node M1 receives the position information of the anchor nodes A1-A6 and forms a sum weighted with the respective reception powers, in order to determine a weighted centroid, in accordance with WCL. The position determined in this way is indicated in FIG. 6b as a solid circle, wherein it can be seen that the position is distorted by the accumulation of the anchor nodes in the upper right corner, so that now high inaccuracy occurs.

Another conventional method is the cellular position determination, wherein a cellular communication network is assumed here, also referred to as convex position estimation in English. Here, position determination takes place merely on the basis of a known cell identification (also referred to as cell ID in English), wherein this method has high inaccuracy, because no distance estimation whatsoever is taken into account, and the accuracy is determined by the size of a cell.

Another conventional method is triangulation, wherein a reception position is determined by trigonometric calculation of, for example, three or more transmitter positions. The distance estimates used are often too inaccurate to allow for exact triangulation, and hence for position determination.

Another conventional method is the so-called maximum likelihood multilateration, i.e. the maximation of a probability of a position estimation, wherein error minimization of a solution of a linear system of equations is used for position determination. This method is highly computation-intensive and necessitates a relatively dense network, which means that the respective anchor nodes must not be too far apart, because this method otherwise becomes error-prone.

Localization by way of WCL for location determination by means of received anchor positions, which are weighted with their reception field strengths (also referred to as RSSI=Received Signal Strength Indicator), as has been described on the basis of FIG. 6a, necessitates at least three non-collinear anchors for 2D position calculation. If additional redundant anchor positions are received from a network node, these can be used for the reduction of inaccuracies or variations of the RSSI values. For example, spurious quantities can be reduced by averaging RSSI values.

According to FIG. 6b, there may arise a problem of multiple weighting of anchor nodes lying closely together, which causes additional inaccuracies. Basically, WCL can be used because it has very little complexity and thus can be implemented well in embedded systems, but it has disadvantages with respect to the accuracy of the position determination, according to the above description.

SUMMARY

According to an embodiment, a device for determining a device position may have: a receiver for receiving signals of a plurality of transmitters; a determiner for determining reception powers of the signals of the plurality of transmitters; a provider for providing transmitter positions of the transmitters on the basis of the signals of the plurality of transmitters; and a determiner for determining a first position of the device on the basis of the transmitter positions, wherein the determiner for determining the first position is further formed to determine transmitter directions on the basis of the first position and the transmitter positions, wherein the determiner for determining the first and the second position is formed to combine transmitters to virtual transmitters with virtual transmitter positions and virtual reception powers on the basis of the transmitter directions and the reception powers, and to determine a second position of the device on the basis of the transmitter directions, the transmitter positions, the virtual transmitter positions and the reception powers, wherein a deviation between the second position and the device position is less than a deviation between the first position and the device position.

According to another embodiment, a method of determining a device position may have the steps of: receiving signals of a plurality of transmitters; determining reception powers of the signals of the plurality of transmitters; providing transmitter positions of the transmitters on the basis of the signals of the plurality of transmitters; determining a first position on the basis of the transmitter positions; determining the transmitter directions on the basis of the first position and the transmitter positions; combining transmitters to virtual transmitters with virtual transmitter positions and virtual reception powers on the basis of the transmitter directions and the reception powers; determining a second position on the basis of the transmitter directions, the transmitter positions, the virtual transmitter positions and the reception powers, wherein a deviation between the second position and the device position is less than a deviation between the first position and the device position.

According to another embodiment, a computer program may have a program code for performing, when the computer program is executed on a computer, a method of determining a device position, wherein the method may have the steps of: receiving signals of a plurality of transmitters; determining reception powers of the signals of the plurality of transmitters; providing transmitter positions of the transmitters on the basis of the signals of the plurality of transmitters; determining a first position on the basis of the transmitter positions; determining the transmitter directions on the basis of the first position and the transmitter positions; combining transmitters to virtual transmitters with virtual transmitter positions and virtual reception powers on the basis of the transmitter directions and the reception powers; determining a second position on the basis of the transmitter directions, the transmitter positions, the virtual transmitter positions and the reception powers, wherein a deviation between the second position and the device position is less than a deviation between the first position and the device position.

According to one embodiment, the present invention provides a device for determining a device position with a means for receiving signals of a plurality of transmitters. Furthermore, the device comprises a means for determining reception powers of the signals of the plurality of transmitters and a means for providing transmitter positions of the transmitters on the basis of the signals of the plurality of transmitters. The device further includes a means for determining a first position of the device, based on the transmitter positions, wherein the means for determining the first position is further formed to determine transmitter directions on the basis of the first position and the transmitter positions, and to determine a second position of the device on the basis of the transmitter directions, the transmitter positions and the reception powers. A deviation between the second position and the device position, for example or even probably, is less than a deviation between the first position and the device position. By iteratively repeating the process, the deviation can be improved further, on average.

Embodiments of the present invention further provide a method of determining a device position with a step of receiving signals of a plurality of transmitters and a step of determining reception powers of the signals of the plurality of transmitters. Furthermore, the method includes a step of providing transmitter positions of the transmitters on the basis of the signals of the plurality of transmitters and a step of determining a first position on the basis of the transmitter positions. The method further includes a step of determining transmitter directions on the basis of the first position and the transmitter positions, as well as a step of determining a second position on the basis of the transmitter directions, the transmitter positions and the reception powers.

Embodiments of the present invention are based on the finding that, on the basis of a first, more inaccurate position, it can be determined which transmitter is located in what direction. Thereby, accumulation points, such as shown in FIG. 6b, can be determined and taken into account in a determination of a second position such that the accuracy of the second position can increase with respect to the first one. Embodiments may further comprise additional steps, wherein the second position now serves as a starting point for the determination of transmitter directions, whereupon more accurate determination of the transmitter directions may take place, which again allows for more accurate determination of the device position, etc.

Accordingly, embodiments may, for example, use the WCL method, wherein this method is preceded by a step capable of grouping and combining the surrounding groups such that improved accuracy of position determination results. Embodiments may, for example, combine anchor nodes lying closely together to a virtual anchor node or transmitter, wherein the WCL algorithm may then provide a correspondingly more accurate position on the basis of the virtual anchor nodes, for example.

Embodiments may at first determine an initial position or a first position, for example by determining a centroid or by way of the weighted centroid method. Here, all received position information can be taken into account. The position thus determined is now considered a starting point for improved position determination, which may be divided into phases, a selection phase and a replacement phase, for example. These two phases may be applied repeatedly, wherein additional accuracy in the position determination can be achieved. An evaluation function may here render improvements detectable and thus implement an abortion criterion for an iteration.

Other elements, features, steps, characteristics and advantages of the present invention will become more apparent from the following detailed description of the preferred embodiments with reference to the attached drawings.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
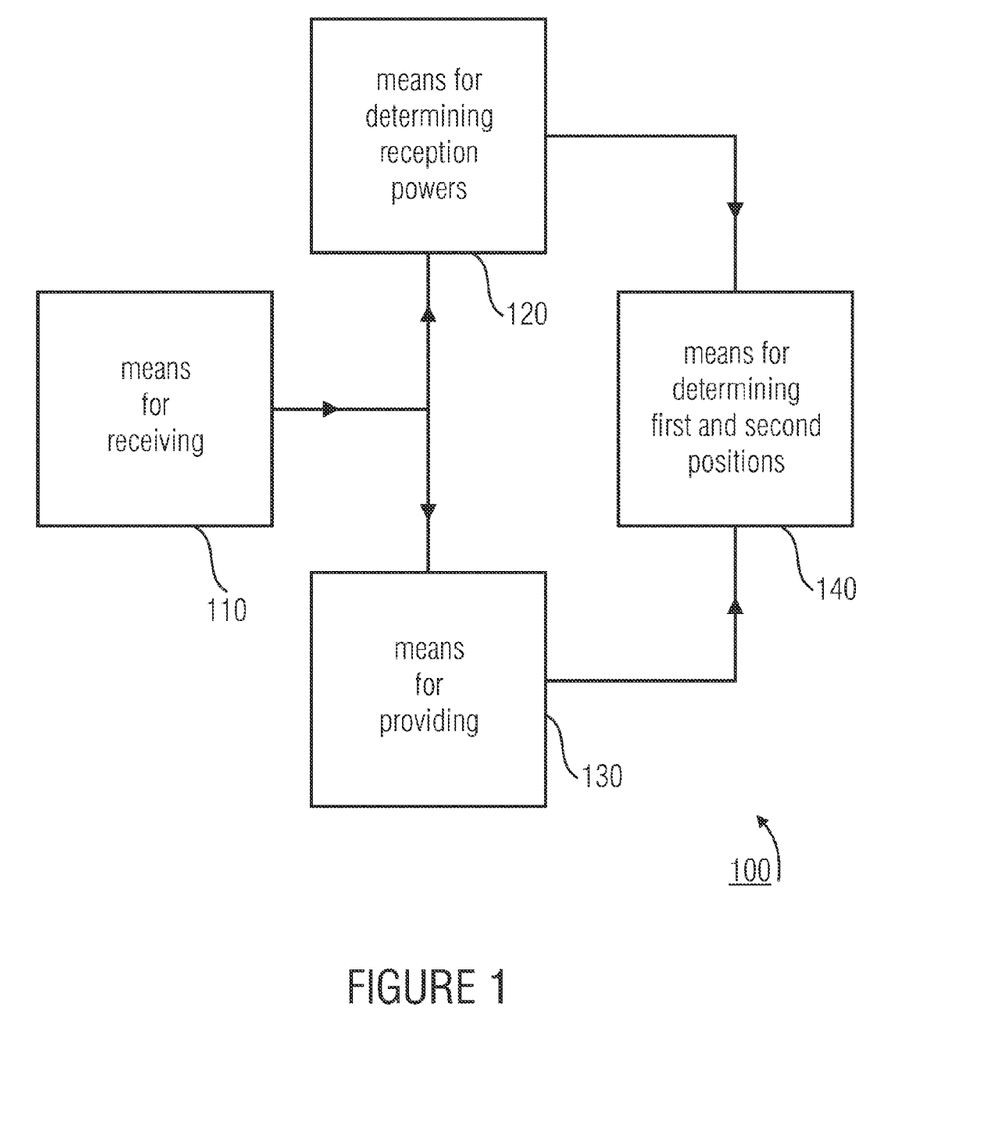
FIG. 1 shows an embodiment of a device for determining a device position.

FIG. 1 shows an embodiment of a device for determining a device position. The device 100 includes a means 110 for receiving signals of a plurality of transmitters and a means 120 for determining reception powers of the signals of the plurality of transmitters. The device further includes a means 130 for providing transmitter positions of the transmitters, based on the signals of the plurality of transmitters. Furthermore, the device 100 includes a means 140 for determining a first position of the device 100, based on the transmitter positions, wherein the means 140 for determining the first position is further formed to determine transmitter directions on the basis of the first position and the transmitter position, and to determine a second position of the device 100 on the basis of the transmitter directions, the transmitter positions and the reception powers, wherein a deviation between the second position and the device position is less than a deviation between the first position and the device position.

In embodiments, the means 140 for determining the first and the second position may be formed to determine improved transmitter directions on the basis of the second position and the transmitter positions, and to determine an improved position on the basis of the improved transmitter directions, wherein a deviation between the device position and the improved position may be less than the deviation between the second position and the device position, and also is, for example—with higher or above-average probability—in the case of equal weighting of the possible constellations of input parameters.

In embodiments, the means 140 for determining the first and the second position may further be formed to determine improved and/or further transmitter directions on the basis of improved and/or further positions, and subsequently again improved and/or again further positions on the basis of the improved and/or again further transmitter directions, until an abortion criterion is met. In such an embodiment, an iterative method may be employed. Embodiments here may take advantage of the fact that more accurate determination of the transmitter directions may take place on the basis of improved positions of the preceding iteration. If the transmitter directions are determined more accurately, better selection or combination of relevant anchor nodes or transmitters may take place. The means 140 for determining the first and the second position may further be formed to combine transmitters to virtual transmitters with virtual transmitter positions and virtual reception powers on the basis of the transmitter directions and the reception powers and/or determine the same. Here, embodiments may combine more and more transmitters or also virtual transmitters to virtual transmitters in the course of the iteration, so that an accumulation of transmitters and/or virtual transmitters in a certain direction decreases more and more, thus allowing for ever more accurate position determination. In embodiments, corruption of a position determination may thus be reduced iteratively. Here, each iteration does not necessarily have to represent an improvement with respect to the immediately preceding iteration step. Rather, it may be the case that a new position obtained in one iteration has, in reality, a slightly greater distance from the correct position than the position from which the current iteration started. On average over the iterations, however, improvement will be achieved, the course of which may reach saturation over the iterations.

In embodiments, the means 140 for determining the first and the second position may further be formed to combine transmitters and virtual transmitters to virtual transmitters until the transmitter directions of the transmitters and of the virtual transmitters differ from each other by angles greater than a predefined minimum angle, or a minimum number of transmitters and virtual transmitters no longer is reached, wherein transmitters or virtual transmitters the transmitter directions of which differ by less than the minimum angle can be selected for combining. The minimum angles may here have values of 10°, 20°, 30°, 60°, 120°, etc., for example. A minimum number of transmitters or virtual transmitters may be 2, 3, 4, 5, 6, etc., for example.

In embodiments, the means 140 for determining the first and the second position may be formed to determine a position of a virtual transmitter according to the co-ordinates $x_v$ and $y_v$ in accordance with $$x_v = \frac{\Delta_{i+1} \cdot r_{i+1} \cdot x_{i+1} + \Delta_{i-1} \cdot r_i \cdot x_i}{\Delta_{i+1} \cdot r_{i+1} + \Delta_{i-1} \cdot r_i},$$

$$y_v = \frac{\Delta_{i+1} \cdot r_{i+1} \cdot y_{i+1} + \Delta_{i-1} \cdot r_i \cdot y_i}{\Delta_{i+1} \cdot r_{i+1} + \Delta_{i-1} \cdot r_i},$$

$$r_v = \frac{\Delta_{i+1} \cdot r_{i+1}^2 + \Delta_{i-1} \cdot r_i^2}{\Delta_{i+1} \cdot r_{i+1} + \Delta_{i-1} \cdot r_i},$$

with $\Delta_{i-1}$, $\Delta_{i+1}$ neighboring angle differences, ($x_v$, $y_v$) virtual anchor/transmitter position, ($x_i$, $y_i$), ($x_{i+1}$, $y_{i+1}$) selected anchor/transmitter (virtual transmitter) positions, $r_v$, $r_i$, $r_{i+1}$ RSSI values.

Furthermore, the means (140) for determining the first and the second position may be formed to determine an average value of the deviation squares of the angle differences of the transmitting directions of the transmitters or the virtual transmitters as an evaluation function V, in accordance with $$\delta = \frac{1}{2} \cdot \frac{360}{n}$$

$$V = \frac{1}{n} \sum_{i=1}^{n} (\Delta_i - \delta)^2,$$

wherein n is the number of the transmitters or virtual transmitters, and $\Delta_i$ the angles between neighboring transmitters and/or virtual transmitters, and to abort if the average value becomes greater or increases throughout a certain number of iteration steps or the average value shows at least a tendency of no longer dropping, or to abort additionally or alternatively if the value falls below a predetermined threshold.

In embodiments, the means 130 for providing may further be formed to provide the transmitter positions of the transmitters on the basis of the reception powers and the reception directions. The means 130 for providing may further be formed to provide the reception direction on the basis of reception signals of a plurality of antennas. Here, in embodiments, antenna fields, so-called antenna arrays, or other directional antennas may be employed. With the aid of antenna fields, which may for example be in circular, linear, triangular or any other geometrical shapes, for example, the direction of incidence of signals of individual transmitters may be estimated, which may then be used as transmitter directions in embodiments. The means 130 for providing may provide both, transmitter positions by estimation of the direction and distance via the radio field attenuation as well as the transmitter directions directly, on the basis of such estimation.

In other embodiments, the means 130 for providing may be formed to determine the transmitter positions by way of detection of position information from the signals of the plurality of transmitters. Here, for example, a transmitter could be equipped with a GPS (Global Positioning System) means to determine its position. The equipment with a GPS module here is to be understood as exemplary, in principle, all methods of determining a position are possible, particularly also a stationary or quasi-stationary scenario, wherein a transmitter is no longer mobile, but has a fixed, invariable and/or slowly variable position. Accordingly, a transmitter could send its position as information in a transmission signal to the means 130 for providing, which may determine the position of a transmitter by way of detection of same information. Furthermore, the means 130 for providing may take the received field strength and/or the reception power into account, in order to take an estimate for the distance of the transmitter into account from a known transmission power and known radio field attenuation.

In embodiments, the means 140 for determining the first and the second position may further be formed to determine positions by ascertaining a centroid or by ascertaining a centroid averaged by the reception power between the transmitters. Furthermore, the means 140 for determining the first and the second position may be formed to determine positions by cellular position determination, by trigonometric calculation of the position, or by error minimization of a system of equations.

In embodiments, the means 140 for determining the first and the second position may further be formed to relate a spatial proximity of the transmitters to a distance between the transmitters so as to obtain a criterion for combining transmitters. Furthermore, symmetries of the transmitters among each other can be taken into account in the determination of the position or in combining. In an evaluation function, furthermore, the reception powers of various transmitters may be taken into account.

Figure 2:
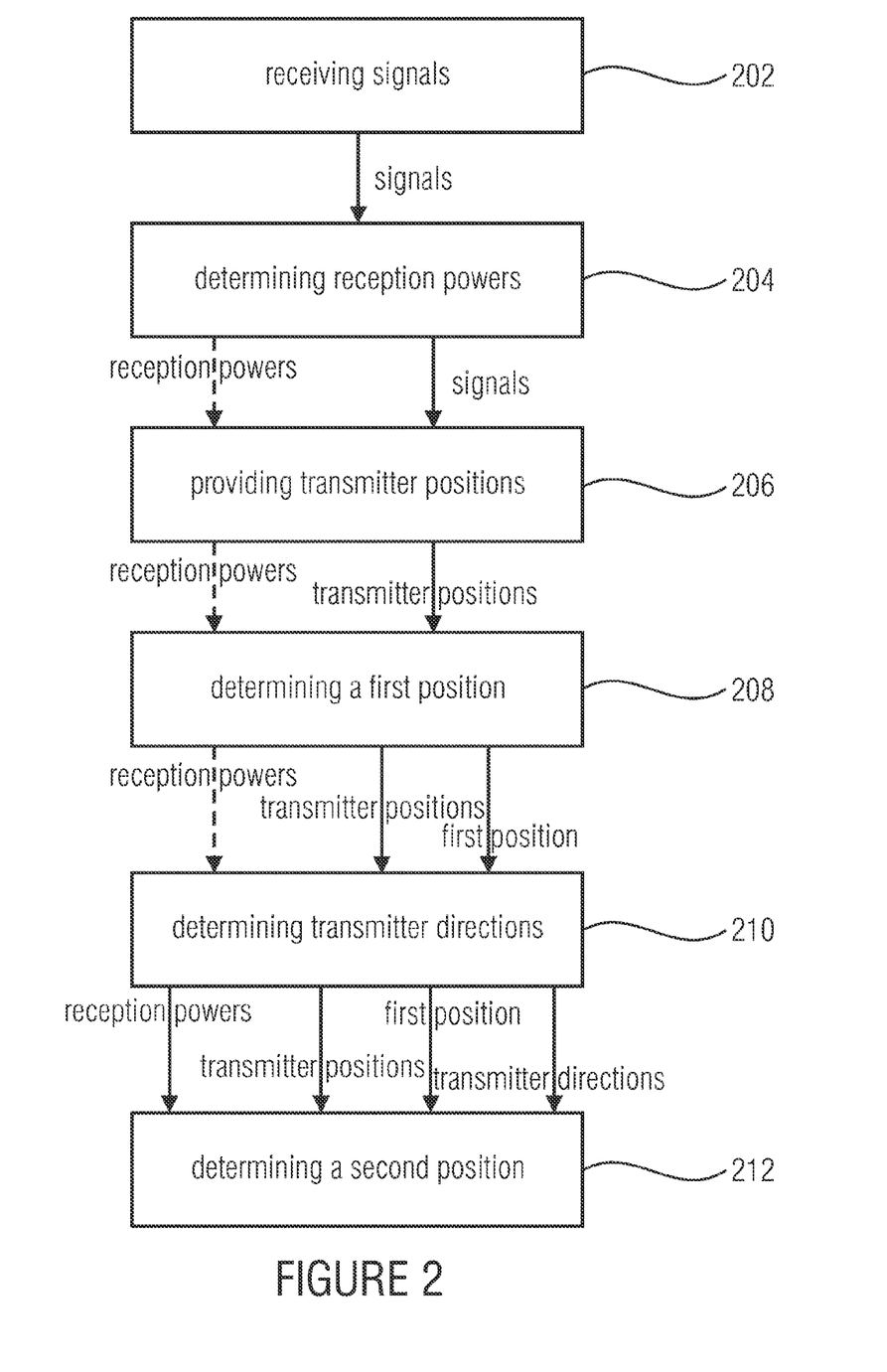
FIG. 2 shows an embodiment of a flowchart of a method of determining a device position.

FIG. 2 shows a flowchart of a method of determining a device position. A step 202 of receiving signals of a plurality of transmitters is followed by step 204 of determining reception powers on the basis of the signals of the plurality of transmitters. Subsequently, there is a step 206 of providing transmitter positions of the transmitters on the basis of the signals of the plurality of transmitters. In embodiments, in step 206, the reception powers may also be taken into account, which is indicated by a dashed arrow. In a step 208, determining a first position on the basis of the transmitter positions takes place, wherein the reception powers may also be taken into account optionally. In a step 210, the transmitter direction may be determined on the basis of the transmitter positions and the first position, wherein the reception powers may also be taken into account optionally here. In a last step 212, a second position is determined on the basis of the transmitter directions, the transmitter positions and the reception powers, wherein a deviation between the second position and the device position is less than a deviation between the first position and the device position.

Figure 3:
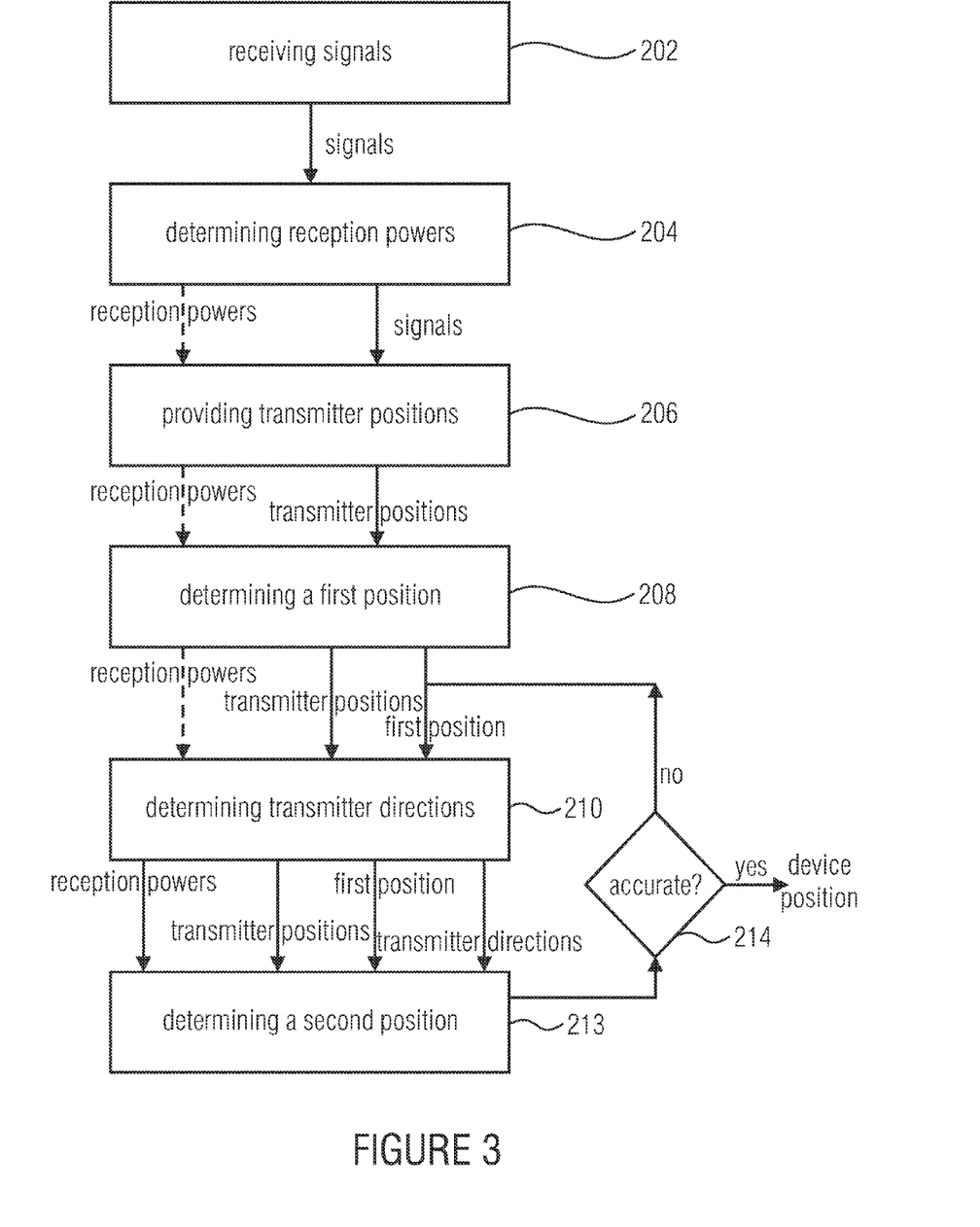
FIG. 3 shows a further embodiment of a flowchart of a method of determining a device position.

In embodiments, the method may comprise a loop, wherein the step 212 of determining the second position may be replaced by a step 213 of determining an improved position. FIG. 3 shows an embodiment of a flow chart of such a method. Here, in a step 214, an accuracy check of the results takes place. If a certain accuracy is not yet present, the improved position from step 213 may be supplied, as now first position, to step 210 of determining transmitter directions, wherein improved transmitter directions can be determined. Based on the improved transmitter directions, in step 213, an improved position may again be determined. If the desired accuracy has been reached, in step 214, the respective improved position is output as the device position. The loop described may then be passed through until a respective abortion criterion is met. An abortion criterion may, for example, be the variance of the angles between the remaining virtual transmitters and/or transmitters. Since equal distribution would provide an optimum result, the variance toward the top can be estimated, which means that the loop may, for example, be aborted when the variance of the remaining angles drops below a certain value.

Figure 4:
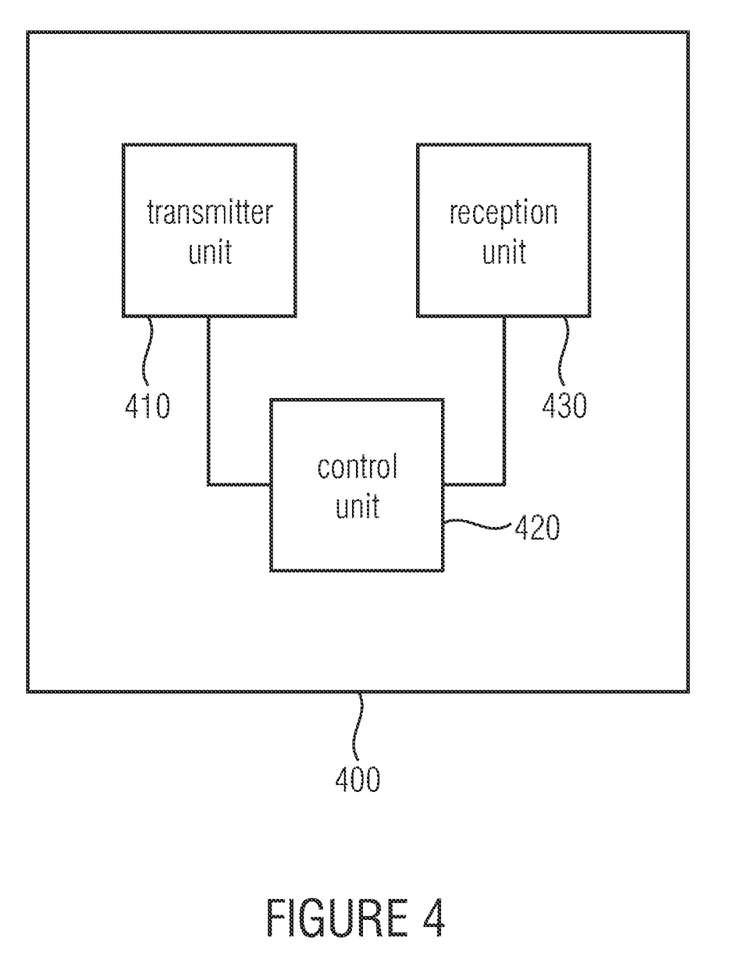
FIG. 4 shows an embodiment of a network node.

FIG. 4 exemplarily shows a network node 400 having a transmitting unit 410, a control unit 420 and a reception unit 430. Embodiments of a device 100 may, for example, be integrated in a network 400, wherein the transmitting unit 410 and the control unit 420 may be optional. The transmitters involved may further be equipped according to FIG. 4, wherein the reception unit 430 and the control unit 420 may be optional then. Embodiments can thus make do with a reception unit 430, wherein the transmitters, the transmitter position of which is being ascertained, only necessitate a transmitting unit 410 for providing their transmitter positions.

Embodiments can be subdivided in accordance with two phases, a selection phase and a replacement phase. In the selection phase, it is searched for anchor nodes and/or transmitters or virtual transmitters that are located especially favorably with respect to each other. A directional angle starting from the initial position or the first position can be determined for each transmitter. Various embodiments are possible here. For example, the transmitters could communicate their positions explicitly in the signals, such as their GPS coordinates. In general, any coordinates a transmitter can determine also by way of other mechanisms are possible. With stationary transmitters in particular, their coordinates may be default. Another possibility would be the employment of so-called directional antennas, or antenna fields. Antennas having a given directional characteristic are employed here. This may be achieved by corresponding antenna geometries or arrangement of several antennas. Here, circular, triangular, linear and, in principle, any geometries that can be realized and on the basis of which a directional or angular estimation can be performed are possible.

In embodiments, the transmitters or anchor nodes may then be sorted in accordance with their angles, whereupon they can be passed through in order, and the differences of the angles between neighboring anchors can be calculated. In embodiments, for example, then a minimum angle difference or one falling below a threshold is determined, and the two transmitters, virtual transmitters and/or anchor nodes having the said angles therebetween are selected for combining to a virtual node and/or transmitter.

The replacement phase now aims at removing the minimum angle difference, also another angle difference, by replacing two selected anchor nodes, transmitters or virtual transmitters with a virtual transmitter and/or anchor node. This virtual anchor node again has a transmitter position and a reception power, such as an RSSI value. The position then lies between the two selected transmitters and/or anchor nodes, the reception power and/or the RSSI value lies between the reception powers and/or RSSI values of the selected anchor nodes, transmitters or virtual transmitters. The values may then be weighted in the relation of the neighboring angle differences and the RSSI values of the selected anchor nodes, in one embodiment. Thereby, the neighboring angle differences of the virtual transmitter or anchor node may become as equal as possible, wherein the RSSI values can be taken into account.

In one embodiment, the calculation may take place in accordance with the following formula:

$$x_v = \frac{\Delta_{i+1} \cdot r_{i+1} \cdot x_{i+1} + \Delta_{i-1} \cdot r_i \cdot x_i}{\Delta_{i+1} \cdot r_{i+1} + \Delta_{i-1} \cdot r_i},$$

$$y_v = \frac{\Delta_{i+1} \cdot r_{i+1} \cdot y_{i+1} + \Delta_{i-1} \cdot r_i \cdot y_i}{\Delta_{i+1} \cdot r_{i+1} + \Delta_{i-1} \cdot r_i},$$

$$r_v = \frac{\Delta_{i+1} \cdot r_{i+1}^2 + \Delta_{i-1} \cdot r_i^2}{\Delta_{i+1} \cdot r_{i+1} + \Delta_{i-1} \cdot r_i},$$

with $\Delta_{i-1}, \Delta_{i+1}$ neighboring angle differences, $(x_v, y_v)$ virtual anchor/transmitter position, $(x_i, y_i), (x_{i+1}, y_{i+1})$ selected anchor/transmitter (virtual transmitter) positions, $r_v, r_i, r_{i+1}$ RSSI values.

In embodiments, so as to provide for an abortion criterion, an evaluation function may be employed. An evaluation function, for example, is the improvement of a certain position after an above-described pass through a selection phase and a replacement phase. Altogether, there may be one pass for each redundant anchor, wherein one transmitter an/or anchor node is removed by combining in each pass. It is the aim of this iteration, for example, to determine a centroid, i.e. laying the direction of the anchor nodes or transmitters as equally distributed as possible around their own position, i.e. the device position. In an optimum case, if all angle differences or RSSI values were equally large, the device position would be equal the centroid between the remaining transmitters and virtual transmitters. In one embodiment, the variance V of the angle differences lends itself as an evaluation function. The average of the deviation squares of the angle differences to the expected value $$\delta = \frac{1}{2} \cdot \frac{360}{n}$$

can be found, wherein n equals the number of transmitters and/or virtual transmitters, $$\delta = \frac{1}{2} \cdot \frac{360}{n}$$

$$V = \frac{1}{n} \sum_{i=1}^{n} (\Delta_i - \delta)^2.$$

For example, by way of the comparison of the variants values prior to and after one pass, it may be decided whether the device position becomes more accurate with WCL or not. Likewise, the iteration of the refinement may be aborted at a sufficiently favorable distribution of the anchors and/or transmitters and virtual transmitters.

In embodiments, also other replacement strategies may be employed in the replacement phase, whereby adaptation to the respective employment scenario is made possible. For example, the spatial proximity of individual anchors with respect to each other could be related to the distance to the device, so as to achieve grouping. In other embodiments, it is conceivable to take anchor symmetries, i.e. transmitter symmetries and virtual transmitter symmetries, into account in the selection phase and/or in the evaluation function: Furthermore, an evaluation function in one embodiment could also take the RSSI values, i.e. the reception powers, into account.

In general, it can be stated that embodiments optimize methods of position determination, wherein only little overhead for the WCL method is needed, for example, but the accuracy can be increased significantly, because a shift of the position computed with WCL in the direction of transmitters or anchor nodes lying closely together can be avoided effectively. In other embodiments, it is also conceivable to intentionally place several anchor nodes or transmitters so that, from a certain preferential direction, redundancy develops by grouping of transmitters. Embodiments thus allow for averaging the inaccurate and varying RSSI values and/or reception powers. Via the evaluation function, a measure of the accuracy of the position can be ascertained, from which an effective iteration loop may develop. Embodiments also manage without additional messages between transmitters and the device.

Figure 5A:
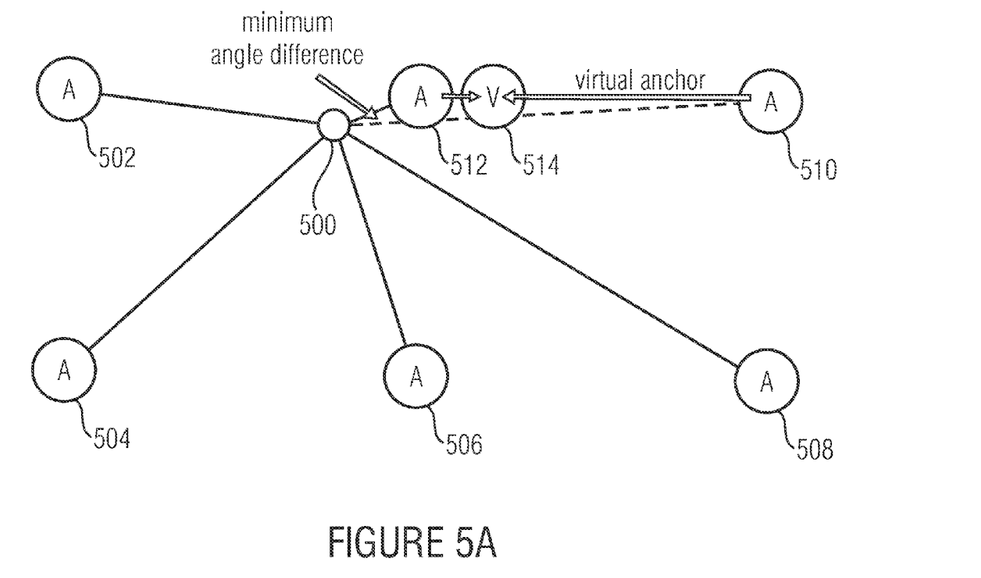
FIG. 5a shows an embodiment of a determination of a virtual anchor or virtual transmitter.
Figure 5B:
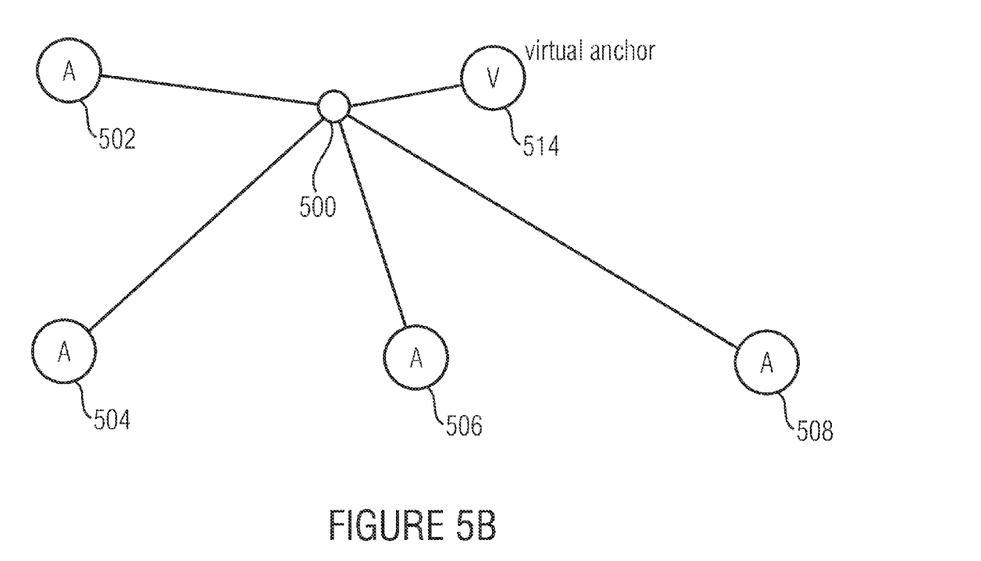
FIG. 5b shows an embodiment of a determination of a virtual anchor or a virtual transmitter.

FIG. 5a again explains an embodiment of a method of position determination. FIG. 5a shows a network node or a device for position determination 500, which is surrounded by several anchor nodes 502, 504, 506, 508, 510 and 512. As can be seen in FIG. 5a, there is a minimum angle difference between the anchor nodes 510 and 512. Embodiments may now combine the anchor nodes or transmitters 510 and 512 to a virtual anchor or virtual transmitter 514, as indicated by the two arrows in FIG. 5a. FIG. 5b shows the resulting scenario, in which the two anchor nodes and/or transmitters 510 and 512 now have been replaced by the virtual anchor or transmitter 514. It can be seen that embodiments thus achieve improved distribution of the angle differences of the transmitters that are involved in the position determination. FIG. 5b shows the same scenario as FIG. 5a, i.e. the other anchor nodes and/or transmitters 502, 504, 506 and 508 are similar to those from FIG. 5a.

Embodiments realize an advantage in the position determination of a device by referencing an angle distribution of anchor nodes or transmitters, which are used for determining the position. Embodiments first determine the transmitter directions of those transmitters involved, in order to perform a first, rougher position determination. On the basis of this first position, now the angles and the angle differences between the direction of incidence of the signals of the individual transmitters involved can be determined, wherein an accumulation of transmitters in a certain direction may now be taken into account, whereby again more accurate determination of a second position becomes possible.

In particular, it is pointed out that, depending on the circumstances, the inventive scheme may also be implemented in software. The implementation may be on a digital storage medium, particularly a disk, a CD or a DVD, with electronically readable control signals capable of co-operating with a programmable computer system so that the corresponding method is executed. In general, the invention thus also consists in a computer program product with a program code stored on a machine-readable carrier for performing the inventive method, when the computer program product is executed on a computer. In other words, the invention may thus be realized as a computer program with a program code for performing the method, when the computer program is executed on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A device for determining a position of the device, comprising:
   a receiver arranged to receive a signal of each of a plurality of transmitters;
   a first determiner arranged to determine reception powers of the signals of the plurality of transmitters;
   a provider arranged to provide a transmitter position of each of the plurality of transmitters according to the signal of each of the plurality of transmitters; and
   a second determiner arranged to determine a first position of the device according to the transmitter position of each of the plurality of transmitters,
   wherein the second determiner is further arranged to:
      determine a transmitter direction of each of the plurality of transmitters according to the first position and the transmitter position of each of the plurality of transmitters,
      combine transmitters of the plurality of transmitters, the transmitter directions of the combined transmitters fulfilling a predetermined angular proximity condition, as a virtual transmitter with a virtual transmitter position angularly lying between at least two of the combined transmitters and a virtual reception power between the reception powers of at least two of the combined transmitters, and
      determine a second position of the device according to the virtual transmitter position and the virtual reception power.

2. The device according to claim 1, wherein the second determiner is arranged to determine new transmitter directions according to the second position, and to determine a third position according to the new transmitter directions, wherein a deviation between the position of the device and the third position is less than a deviation between the first position and the position of the device.

3. The device according to claim 2, wherein the second determiner is further arranged to repeatedly determine the third position according to new transmitter directions until an abortion criterion is met.

4. The device according to claim 1, wherein the second determiner is arranged to combine transmitters of the plurality of transmitters or virtual transmitters to the virtual transmitters until the transmitter directions of the transmitters of the plurality of transmitters and the virtual transmitters differ from each other by angles greater than a predefined minimum angle or a minimum number of transmitters of the plurality of transmitters and the virtual transmitters is no longer reached, wherein
   the transmitters of the plurality of transmitters or the virtual transmitters that are selected for combining are determined according to the transmitter directions of the transmitters of the plurality of transmitters and the transmitter directions of the virtual transmitters which differ by less than the minimum angle.

5. The device according to claim 4, wherein the second determiner is arranged to determine a position of a virtual transmitter according to the coordinates $x_v$ and $y_v$ in accordance with $$x_v = \frac{\Delta_{i+1} \cdot r_{i+1} \cdot x_{i+1} + \Delta_{i-1} \cdot r_i \cdot x_i}{\Delta_{i+1} \cdot r_{i+1} + \Delta_{i-1} \cdot r_i},$$

$$y_v = \frac{\Delta_{i+1} \cdot r_{i+1} \cdot y_{i+1} + \Delta_{i-1} \cdot r_i \cdot y_i}{\Delta_{i+1} \cdot r_{i+1} + \Delta_{i-1} \cdot r_i},$$

$$r_v = \frac{\Delta_{i+1} \cdot r_{i+1}^2 + \Delta_{i-1} \cdot r_i^2}{\Delta_{i+1} \cdot r_{i+1} + \Delta_{i-1} \cdot r_i},$$

with
$\Delta_{i-1}$, $\Delta_{i+1}$ neighboring angle differences,
($x_v$, $y_v$) virtual anchor/transmitter position,
($x_i$, $y_i$), ($x_{i+1}$, $y_{i+1}$) selected anchor/transmitter (virtual transmitter) positions,
$r_v$, $r_i$, $r_{i+1}$ RSSI values.

6. The device according to claim 1, wherein
the second determiner is arranged to determine an average value of the deviation squares of the angle differences of the transmitter direction of each of the plurality of transmitters or the virtual transmitters as an evaluation function V in accordance with $$\delta = \frac{1}{2} \cdot \frac{360}{n}$$

$$V = \frac{1}{n} \sum_{i=1}^{n} (\Delta_i - \delta)^2,$$

wherein n is the number of the plurality of transmitters or virtual transmitters, and $\Delta_i$ is an angle between neighboring transmitters of the plurality of transmitters and/or virtual transmitters, and
the second determiner is arranged to abort if the average value falls below a predetermined threshold, or to abort if the average value reaches a tendency of no longer falling.

7. The device according to claim 6, wherein the second determiner is further arranged to further take the reception powers into account in the evaluation function.

8. The device according to claim 1, wherein the provider is further arranged to provide the transmitter position of each of the plurality of transmitters according to the reception powers and a reception direction.

9. The device according to claim 8, wherein the provider is further arranged to provide the reception directions according to reception signals of a plurality of antennas.

10. The device according to claim 8, wherein the second determiner is further arranged to relate a spatial proximity of each of the plurality of transmitters to a distance between the plurality of transmitters, in order to acquire a criterion for combining transmitters of the plurality of transmitters.

11. The device according to claim 1, wherein the provider is arranged to determine the transmitter position of each of the plurality of transmitters by way of detection of position information from the signal of each of the plurality of transmitters.

12. The device according to claim 1, wherein the second determiner is arranged to determine the first position also according to the reception powers.

13. The device according to claim 1, wherein the second determiner is arranged to determine positions by ascertaining a centroid or by ascertaining a centroid averaged by the reception powers between the plurality of transmitters.

14. The device according to claim 1, wherein the second determiner is arranged to determine positions by way of cellular position determination, by way of trigonometric calculation of the position, or by way of error minimization of a system of equations.

15. The device according to claim 1, wherein the second determiner is further arranged to take symmetries of each of the plurality of transmitters and/or virtual transmitters with respect to each other into account when determining the position or when combining.

16. The device according to claim 1, wherein the second determiner is further arranged to determine the second position of the device according to the transmitter direction of each of the plurality of transmitters not included in the combined transmitters and the transmitter position of each of the plurality of transmitters not included in the combined transmitters.

17. The device according to claim 1, wherein the predetermined angular proximity condition is fulfilled by a pair of transmitters of the plurality of transmitters when the transmitter directions of the pair of transmitters have an angular difference that is less than a predetermined threshold.

18. The device according to claim 1, wherein the second determiner is arranged such that a deviation between the second position and the position of the device has a higher probability of being less than a deviation between the first position and the second position than a probability of the deviation between the second position and the position of the device being greater than the deviation between the first position and the second position.

19. A method of determining a device position, comprising:
   receiving a signal of each of a plurality of transmitters;
   determining a reception power of the signal of each of the plurality of transmitters;
   providing a transmitter position of each of the plurality of transmitters according to the signal of each of the plurality of transmitters;
   determining a first position according to the transmitter position of each of the plurality of transmitters;
   determining a transmitter direction of each of the plurality of transmitters according to the first position and the transmitter position of each of the plurality of transmitters;
   combining transmitters of the plurality of transmitters, the transmitter directions of the combined transmitters fulfilling a predetermined angular proximity condition, as a virtual transmitter with a virtual transmitter position angularly lying between at least two of the combined transmitters and a virtual reception power between the reception powers of at least two of the combined transmitters;
   determining a second position according to the virtual transmitter position and the reception power.

20. The method according to claim 19, further comprising determining improved transmitter directions according to the second position.

21. The method according to claim 20, further comprising determining an improved position according to the improved transmitter directions.

22. The method according to claim 21, wherein the improved position according to the improved transmitter directions is repeatedly determined until an abortion criterion is met.

23. The method according to claim 22, wherein the abortion criterion corresponds to an accuracy of the improved position.

24. A non-transitory computer readable medium having a computer program with program code for performing, when the computer program is executed on a computer, a method of determining a device position, the method comprising:
   receiving a signal of each of a plurality of transmitters;
   determining a reception power of the signal of each of the plurality of transmitters;
   providing a transmitter position of each of the plurality of transmitters according to the signal of each of the plurality of transmitters;
   determining a first position according to the transmitter position of each of the plurality of transmitters;
   determining a transmitter direction of each of the plurality of transmitters according to the first position and the transmitter position of each of the plurality of transmitters;
   combining transmitters of the plurality of transmitters, the transmitter directions of the combined transmitters fulfilling a predetermined angular proximity condition, as a virtual transmitter with a virtual transmitter position angularly lying between at least two of the combined transmitters and a virtual reception power between the reception powers of at least two of the combined transmitters;
   determining a second position according to the virtual transmitter positions and the reception power.

* * * * *

UNITED STATES PATENT AND TRADEMARK OFFICE
CERTIFICATE OF CORRECTION

PATENT NO. : 8,515,446 B2  Page 1 of 1
APPLICATION NO. : 12/664203
DATED : August 20, 2013
INVENTOR(S) : Hupp et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 800 days.

Signed and Sealed this

Fifteenth Day of September, 2015

Michelle K. Lee
*Director of the United States Patent and Trademark Office*